(12) United States Patent
Sundararajan et al.

(10) Patent No.: US 11,816,661 B2
(45) Date of Patent: Nov. 14, 2023

(54) CENTRALIZED DIGITAL CURRENCY TRANSACTIONS UTILIZING A DIGITAL WALLET

(71) Applicant: INTERNATIONAL BUSINESS MACHINES CORPORATION, Armonk, NY (US)

(72) Inventors: Mukundan Sundararajan, Bangalore (IN); Siddharth K. Saraya, Raniganj (IN)

(73) Assignee: International Business Machines Corporation, Armonk, NY (US)

(*) Notice: Subject to any disclaimer, the term of this patent is extended or adjusted under 35 U.S.C. 154(b) by 78 days.

(21) Appl. No.: 17/204,130

(22) Filed: Mar. 17, 2021

(65) Prior Publication Data

US 2022/0300949 A1     Sep. 22, 2022

(51) Int. Cl.
*G06Q 20/36* (2012.01)
*G06Q 20/38* (2012.01)
(Continued)

(52) U.S. Cl.
CPC ..... *G06Q 20/3672* (2013.01); *G06Q 20/0655* (2013.01); *G06Q 20/3278* (2013.01);
(Continued)

(58) Field of Classification Search
CPC .......... G06Q 20/3672; G06Q 20/0655; G06Q 20/3278; G06Q 20/3674; G06Q 20/3676; G06Q 20/3827
See application file for complete search history.

(56) References Cited

U.S. PATENT DOCUMENTS

| 10,650,374 B1 | 5/2020 | Singh |
| 2015/0046337 A1 | 2/2015 | Hu |

(Continued)

FOREIGN PATENT DOCUMENTS

| EP | 3132405 A1 | 2/2017 |
| JP | 6650543 B1 * | 2/2020 |

(Continued)

OTHER PUBLICATIONS

English translation of JP6650543B1 (Year: 2019).*

(Continued)

*Primary Examiner* — Patrick McAtee
*Assistant Examiner* — Vincent I Idiake
(74) *Attorney, Agent, or Firm* — Elliot J. Shine

(57) ABSTRACT

A method, computer system, and a computer program product for managing digital currency is provided. The present invention may include initializing a digital wallet. The present invention may include receiving one or more digital currencies. The present invention may include performing one or more transactions using the one or more digital currencies, wherein each of the one or more transactions has a hash value recorded on a local ledger maintained on the digital wallet. The present invention may include broadcasting the local ledger to a shared ledger maintained by a fund source. The present invention may include synchronizing the digital wallet with the found source by releasing a value held in suspense based on a total value of the one or more digital currencies remaining on the digital wallet.

20 Claims, 5 Drawing Sheets

(51) Int. Cl.
　　　*G06Q 20/06*　　(2012.01)
　　　*G06Q 20/32*　　(2012.01)
(52) U.S. Cl.
　　　CPC ..... *G06Q 20/3674* (2013.01); *G06Q 20/3676* (2013.01); *G06Q 20/3827* (2013.01)

(56) References Cited

U.S. PATENT DOCUMENTS

| | | | | |
|---|---|---|---|---|
| 2017/0053249 | A1* | 2/2017 | Tunnell | G09C 5/00 |
| 2020/0265458 | A1 | 8/2020 | Esecson | |
| 2021/0042758 | A1* | 2/2021 | Durvasula | G06Q 20/389 |
| 2021/0166223 | A1* | 6/2021 | Moiyallah, Jr. | G06Q 20/389 |
| 2021/0184841 | A1* | 6/2021 | Shpurov | H04L 9/3265 |
| 2022/0138705 | A1* | 5/2022 | Wright | G06Q 20/065 705/39 |
| 2022/0292496 | A1* | 9/2022 | Yan | G06Q 40/04 |

FOREIGN PATENT DOCUMENTS

| | | |
|---|---|---|
| WO | 2008111975 A2 | 9/2008 |
| WO | 2020181339 A1 | 9/2020 |

OTHER PUBLICATIONS

English translation of Cover page of JP6650543B1 (Year: 2019).*
JP6650543B1_Information_processing_apparatus_method_and_program_Google_Patents.pdf (Year: 2019).*
Dmitrienko, et al., "On Offline Payments with Bitcoin (Poster Abstract)," [accessed on Mar. 10, 2021], 2 pages.
Mell, et al., "The NIST Definition of Cloud Computing", National Institute of Standards and Technology, Special Publication 800-145, Sep. 2011, 7 pages.

* cited by examiner

CENTRALIZED DIGITAL CURRENCY TRANSACTIONS UTILIZING A DIGITAL WALLET

BACKGROUND

The present invention relates generally to the field of computing, and more particularly to digital currency transactions.

Transactions using digital currency may require both parties to share the same type of wallet, deal in the same currency, and/or have an established network connection. Accordingly, it may be difficult for the parties to complete a transaction if either party lacks network connectivity or the requisite bandwidth to transmit a signal, among other things. Additionally, the digital currency in which the two parties are utilizing for their transaction may be susceptible to price volatility.

Furthermore, it may be difficult to track the digital currencies being exchanged between digital wallets as well as the identities of the parties to the transaction.

SUMMARY

Embodiments of the present invention disclose a method, computer system, and a computer program product for managing a digital currency. The present invention may include initializing a digital wallet. The present invention may include receiving one or more digital currencies. The present invention may include performing one or more transactions using the one or more digital currencies, wherein each of the one or more transactions has a hash value recorded on a local ledger maintained on the digital wallet. The present invention may include broadcasting the local ledger to a shared ledger maintained by a fund source. The present invention may include synchronizing the digital wallet with the found source by releasing a value held in suspense based on a total value of the one or more digital currencies remaining on the digital wallet.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
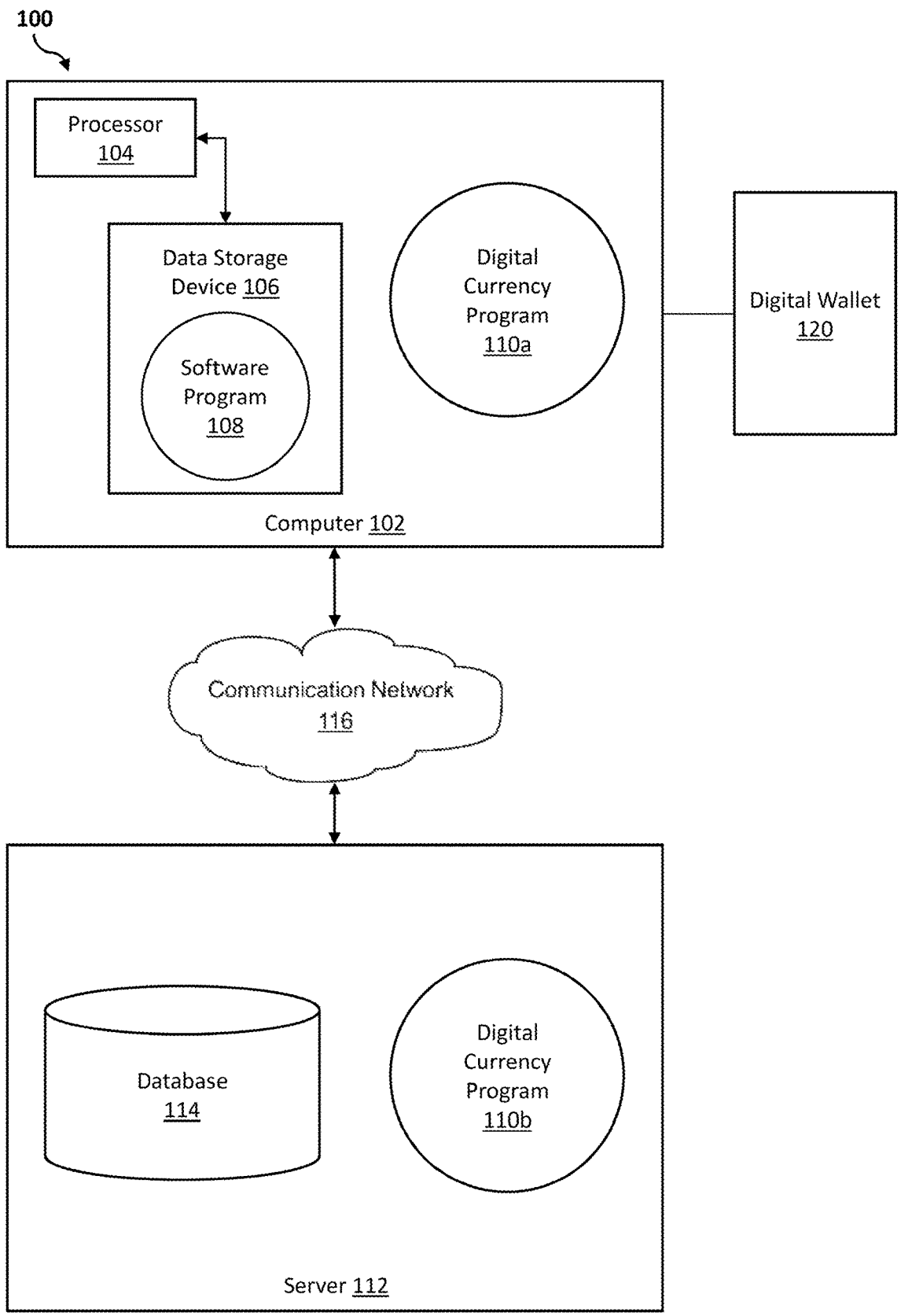
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for managing digital currency. As such, the present embodiment has the capacity to improve the technical field of digital currency transaction by enabling the tracking of one or more denominations of one or more digital currencies between two or more digital wallets. More specifically, the present invention may include initializing a digital wallet. The present invention may include receiving one or more digital currencies. The present invention may include performing one or more transactions using the one or more digital currencies, wherein each of the one or more transactions has a hash value recorded on a local ledger maintained on the digital wallet. The present invention may include broadcasting the local ledger to a shared ledger maintained by a fund source. The present invention may include synchronizing the digital wallet with the found source by releasing a value held in suspense based on a total value of the one or more digital currencies remaining on the digital wallet.

As described previously, transactions using digital currency may require both parties to share the same type of wallet, deal in the same currency, and/or have an established network connection. Accordingly, it may be difficult for the parties to complete a transaction if either party lacks network connectivity or the requisite bandwidth to transmit a signal, among other things. Additionally, the digital currency in which the two parties are utilizing for their transaction may be susceptible to price volatility.

Furthermore, it may be difficult to track the digital currencies being exchanged between digital wallets as well as the identities of the parties to the transaction.

Therefore, it may be advantageous to, among other things, initialize a digital wallet, receive one or more digital currencies, perform one or more transactions using the one or more digital currencies, wherein each of the one or more transactions has a hash value recorded on a local ledger maintained on the digital wallet, broadcast the local ledger to a shared ledger maintained by a fund source, and synchronize the digital wallet with the fund source by releasing a value held in suspense based on a total value of the one or more digital currencies remaining on the digital wallet.

According to at least one embodiment, the present invention may improve tracking digital currency transactions by earmarking one or more denominations of one or more digital currencies received by the digital wallet with a currency identifier.

According to at least one embodiment, the present invention may improve tracking one or more parties involved in a digital currency transaction by identifying a user of a digital wallet with a unique identification address issued by a fund source. The fund source may be a transacting bank, credit union, or other financial institution that receives authentication from the user prior to initializing the digital wallet.

According to at least one embodiment, the present invention may improve tracking one or more parties involved in a digital currency transaction by assigning a unique identification address to the digital wallet. The unique identification address may be specific to the digital wallet and have an active period for a limited duration of time.

According to at least one embodiment, the present invention may improve the ability of digital wallet users to perform two or more transactions asynchronously by recording two or more transactions on a local ledger maintained on the digital wallet prior to updating a shared ledger maintained by a fund source.

According to at least one embodiment, the present invention may value stability in digital currency transactions by issuing digital currencies pegged to a corresponding stable currency.

According to at least one embodiment, the present invention may improve the ability to connect the digital wallets of a transaction utilizing a Near-Field Communication (NFC) protocol. The NFC protocol may allow a wireless transfer between the digital wallets of a digital currency transaction.

According to at least one embodiment, the present invention may improve record keeping of digital currency transactions by generating a hash value for each of the one or more transactions, recording the hash value on a local ledger maintained on the digital wallet, and broadcasting the local ledger to a shared ledger maintained by the fund source.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a digital currency program 110a. The networked computer environment 100 may also include a server 112 that is enabled to run a digital currency program 110b that may interact with a database 114 and a communication network 116. The networked computer environment 100 may include a plurality of computers 102 and servers 112, only one of which is shown. The digital wallet 120 may be connected to the computer 102. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the digital currency program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the digital currency program 110a, 110b (respectively) enable a digital wallet to perform one or more transactions using one or more digital currencies. The digital currency method is explained in more detail below with respect to FIG. 2.

Figure 2:
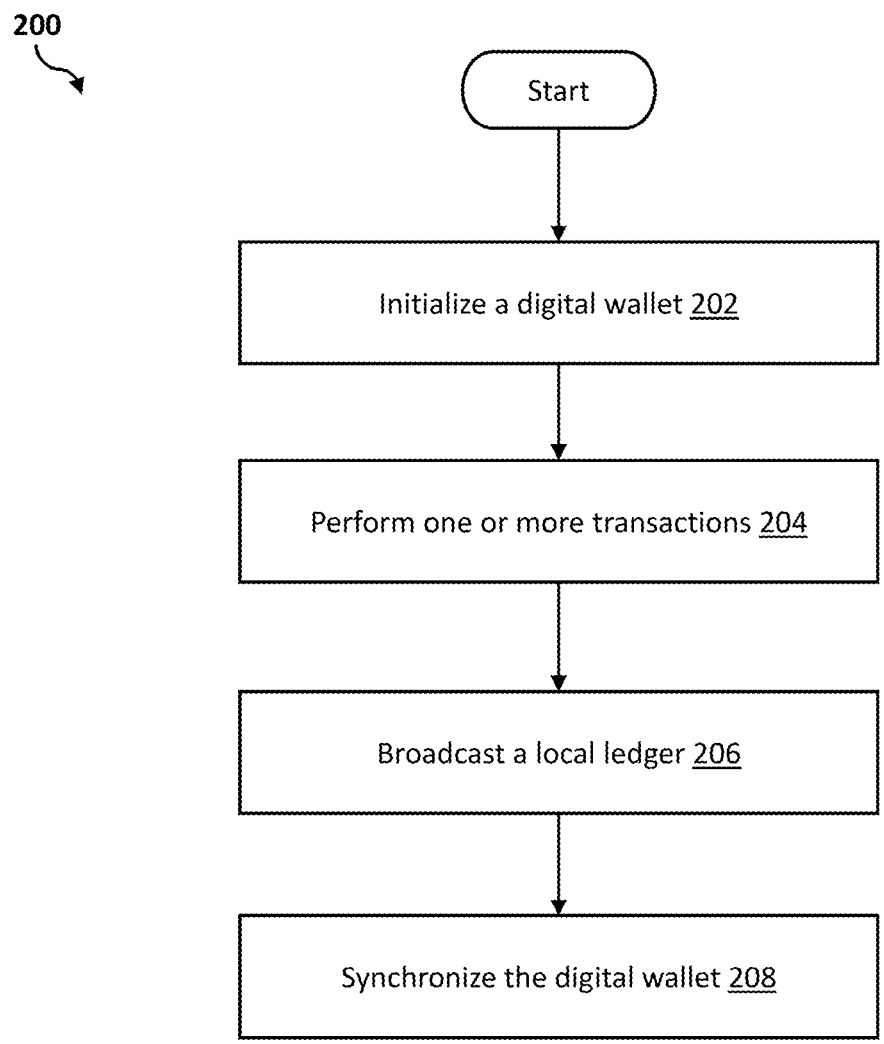
FIG. 2 is an operational flowchart illustrating a process for managing digital currency according to at least one embodiment.

Referring now to FIG. 2, an operational flowchart illustrating the exemplary digital currency process 200 used by the digital currency program 110a and 110b (hereinafter digital currency program 110) according to at least one embodiment is depicted.

At 202, the digital currency program initializes a digital wallet. The digital wallet 120 may be an e-wallet, digital currency pouch, digital purse, or other electronic wallet. The digital wallet 120 may have a defined capacity. The defined capacity may be determined by a user of the digital wallet 120. The defined capacity may be the total value of one or more denominations of one or more digital currencies requested by the user of the digital wallet 120. The user may determine the one or more denominations of the one or more digital currencies of the digital wallet 120. The digital wallet 120 may be an application installed on a mobile device, such as, but not limited to, a smart phone, smart watch, or other electronic device. The digital wallet 120 may utilize the mobile device to connect to other devices or networks through different wireless protocols, such as, but not limited to, Bluetooth® (Bluetooth and all Bluetooth-based trademarks and logos are trademarks or registered trademarks of Bluetooth SIG, Inc., and/or its affiliates), Near-field communication (NFC), Wi-Fi, Li-Fi, 5G, 4G, amongst others.

The digital currency program 110 may require the user of the digital wallet 120 to provide authentication prior to initializing the digital wallet 120. The user may provide authentication such as, but not limited to, government identification, phone number, email, amongst others. The user may provide the authentication to a fund source (e.g., transacting bank, credit union, financial institution). The user of the digital wallet 120 may receive a unique identification address from the fund source (e.g., transacting bank, credit union, financial institution). The digital wallet 120 may be initialized (e.g., the digital wallet may be issued to the user) by the fund source (e.g., transacting bank, credit union, financial institution). The digital wallet 120 may have a digital wallet identifier. The digital wallet identifier may be specific to the digital wallet 120 issued by the fund source. The unique identification address of the user and the digital wallet identifier may be concurrently utilized for an active period of the digital wallet.

Once authenticated by the fund source, the digital wallet 120 may have an active period. The active period may be the amount of time in which the digital wallet identifier and the digital wallet 120 are able to be utilized by the user. The active period may be determined by the user of the digital wallet 120 and approved by the fund source (e.g., transacting bank, credit union, financial institution).

The user may request a defined capacity from the fund source (e.g., transacting bank, credit union, financial institution) to be added to the digital wallet 120. The defined capacity may be the total value of the one or more digital currencies added from the fund source (e.g., transacting bank, credit union, financial institution) to the digital wallet 120. The defined capacity may not be larger than the user's balance held by the fund source (e.g., transacting bank, credit union, financial institution). The defined capacity may be less than or equal to the balance of the user held by the fund source. The fund source may hold a sum of currency equivalent to that of the defined capacity in suspense (e.g., escrow, frozen). The fund source may hold the sum of currency equivalent to that in suspense until the digital currency program 110 synchronizes the digital wallet 120, as will be explained in more detail below with respect to Step 208.

For example, the user may provide authentication to the user's bank and the user may receive the unique identification address "A". The unique identification address "A" may be specific to the user. The digital wallet 120 issued to the user may have the digital wallet identifier "b". The digital wallet identifier "b" may be specific to the user's digital wallet 120. The active period of the digital wallet may be 5 days. For the next 5 days, "Ab" may be utilized to track one or more transactions performed by the user utilizing the digital wallet, as will be explained in more detail with respect to Step 204.

The one or more digital currencies may be pegged to a corresponding stable currency. Pegged to a corresponding stable currency may mean that the one or more digital currencies have a fixed rate of exchange with the corresponding stable currency such that the value of the digital currency rises and falls along with the corresponding stable currency. Stable currencies may include, but are not limited to including, the U.S. dollar (USD), the Indian rupee (INR), the Canadian dollar (CAD), the euro (EUR), the British pound (GBP), the Swiss franc (CHF), the New Zealand dollar (NZD), the Australian dollar (AUD), the Japanese yen (JPY), amongst others. The fund source (e.g., transacting bank, credit union, financial institution) may exchange a native currency of the user for the one or more digital currencies requested by the user utilizing a foreign exchange market. The user may receive the one or more digital currencies to the digital wallet 120 in one or more denominations selected by the user. The user may specify the one or more denominations of the one or more digital currencies. The one or more denominations may be specific to the one or more requested digital currencies. For example, the denominations of the U.S. dollar may be $1, $5, $10, $20, $50, and $100, or any denominations in between as determined by user, for example, $7.50, $25.25.

The digital currency program 110 may earmark the one or more denominations of the one or more digital currencies received by the digital wallet 120 with a currency identifier. The digital currency program 110 may utilize the earmark of the one or more denominations of the one or more digital currencies to track the one or more transactions performed by the user. The digital currency program 110 may send the currency identifier for each of the one or more denominations to the fund source (e.g., transacting bank, credit union, financial institution). The currency identifier may be specific to each of the one or more denominations of the one or more digital currencies received by the digital wallet 120. As will be explained in more detail below with respect to Step 204, the currency identifier for each of the one or more denominations of the one or more digital currencies received by the digital wallet may be utilized by the digital currency program 110 in at least asynchronously transactions and back end updates.

At 204, the digital currency program performs one or more transactions. The digital currency program 110 may perform the one or more transactions at the direction of the user of the digital wallet 120. The digital currency program 110 may perform the one or more transactions between the digital wallet 120 of the user and a second digital wallet of the second user at the direction of the user. The second digital wallet may utilize a mobile application different than the mobile application utilized by the digital wallet 120.

The digital currency program 110 may perform, at the direction of the user, the one or more transactions between the digital wallet 120 of the user and the second digital wallet of the second user utilizing the digital wallet identifier of the digital wallet 120 of the user and the digital wallet identifier of the second digital wallet of the second user. Either the user of the digital wallet 120 or the second user of the second digital wallet may enter the digital wallet identifier of the other. For example, the user of the digital wallet 120 may manually enter the digital wallet identifier of the second digital wallet utilizing the application on the user's mobile device. The user of the digital wallet 120 may also utilize a scannable code, such as, but not limited to, a Quick Response (QR) code, barcode, or other scannable label to enter the unique the digital wallet identifier of the second digital wallet utilizing the a camera or scanner on the user's mobile device.

The digital currency program 110 may utilize an NFC protocol to connect the digital wallet 120 of the user with the second digital wallet to enable performing the one or more transactions. NFC protocol may be a set of communication protocols for communication between two electronic devices. NFC protocol may require the mobile devices being used by the digital wallet and the second digital wallet be close in proximity to one another in order to perform the one or more transactions. The NFC protocol may allow a wireless transfer between the digital wallet 120 and the second digital wallet of the one or more digital currencies without an internet connection. The NFC protocol may allow the digital wallet 120 of the user to connect with the second digital wallet of the second user even if the digital wallet 120 is offline, the second digital wallet is offline, or both the digital wallet 120 and the second digital wallet are offline.

The digital currency program 110 may transfer the one or more digital currencies from the digital wallet 120 of the first user to the second digital wallet of the second user. The user of the digital wallet 120 may be prompted to confirm whether the amount of the one or more digital currencies to be transferred to the second digital wallet is correct. If the user confirms the amount of the one or more digital currencies to be sent to the second digital wallet is correct, that amount of digital currency of the defined capacity of the user 120 may be locked.

The digital currency program 110 may generate a hash value for the one or more transactions. A hash value may be a numeric value of a fixed length that uniquely identifies data. A hash value may be used to represent large amounts of data as a smaller numeric value. The hash value generated by the digital currency program 110 may be generated on a receiving digital wallet. For example, the digital currency program 110 may generate a hash value on the second digital wallet of the second user. The hash value may include, but is not limited to including, the digital wallet identifier of the digital wallet 120 of the user, the amount of digital currency of the transaction, and a label for the transaction. The second user may be prompted to enter the label for the transaction or the label for the transaction may be generated automatically by the digital currency program 110.

The digital currency program 110 may record the one or more transactions on a front end (e.g., local ledger) using the hash vale generated for the transaction. The digital currency program 110 may record the one or more transactions on the front end (e.g., local ledger) using the hash value generated by the digital currency program 110 for the transaction before a back end (e.g., shared ledger) update. The local ledger may be maintained by the digital currency program 110 on the digital wallet 120 of the user and a local ledger maintained on the second digital wallet of the second user. The back end may be a shared ledger maintained by the fund source (e.g., transacting bank, credit union, financial institution) that issued the digital wallet 120 of the user and the second digital wallet of the second user.

The digital currency program 110 may broadcast the hash value for the one or more transactions recorded on the local ledger to the shared ledger maintained by the fund source. The digital currency program 110 may broadcast the hash value of the one or more transactions recorded on the local ledger to the shared ledger when the digital wallet 120 has an established network connection. The digital currency program 110 may broadcast the hash value of the one or more transactions recorded on the local ledger to the shared ledger and other transactional information when the digital wallet 120 has an established network connection, as will be explained in more detail below.

The digital currency program 110 may utilize the hash value to record the one or more digital currencies exchanged as either sent or received on the digital wallet 120 of the user. The digital currency program 110 may not allow sent digital currency to be double spent by the user of the digital wallet 120. The digital currency program 110 may allow digital currency received by the user of the digital wallet 120 from the second user to immediately be sent to a third digital wallet of a third user. The digital currency program 110 may record the hash value on the local ledger maintained on the digital wallet 120. The hash value recorded on the local ledger maintained on the digital wallet 120 may include, but is not limited to including, the digital wallet identifier of the second digital wallet, the amount of digital currency of the transaction, and a label for the transaction.

The hash value may also include the unique identification address for the party in which the user of the digital wallet 120 performed a transaction. The hash value may encrypt the unique identification address for the party in which the user of the digital wallet 120 performed the transaction. The unique identification address for the party in which the user of the digital wallet 120 performed the transaction may not be viewable to the user of the digital wallet 120. The currency identifier of the one or more denominations of the digital currency utilized in the transaction may not be viewable to the user of the digital wallet 120 or the second user of the second digital wallet. The unique identification address for the party in which the user of the digital wallet 120 performed the transaction may be viewable on the shared ledger maintained by the fund source (e.g., transacting bank, credit union, financial institution). The currency identified of the one or more denominations of the digital currency utilized in the transaction may be viewable on the shared ledger maintained by the fund source (e.g., transacting bank, credit union, financial institution).

For example, the user of the digital wallet 120 may send a denomination of $20 U.S. dollars to the second digital wallet of the second user. The digital currency program 110 may generate the hash value for the transaction on the second digital wallet and record the hash value on the local ledger of the second digital wallet. The digital currency program 110 may add the denomination of $20 U.S. dollars to a balance of the second digital wallet. The second user of the second digital wallet may be able to send the denomination of the digital currency received from the user of the digital wallet 120 to a third digital wallet of a third user. The second user may be able to send the denomination of the digital currency received immediately after digital currency program 110 transmits the hash value from the second digital wallet to the digital wallet 120 of the user. The second digital wallet may transmit the hash vale to the digital wallet 120 of the user utilizing a communication protocol, such as, but not limited to, an NFC protocol. The digital currency program may record the hash value on the local ledger of the digital wallet 120 of the user. The digital currency program 110 may subtract the $20 U.S. dollar denomination from the defined capacity of the digital wallet 120. The user of the digital wallet 120 may not be able to send the $20 U.S. dollar denomination to a third digital wallet of a third user. The digital currency program 110 may broadcast the local ledger maintained on the digital wallet 120 to the shared ledger maintained by the fund source (e.g., transacting bank, credit union, financial institution) of the user when the digital wallet 120 establishes a network connection. The digital currency program 110 may broadcast the local ledger maintained on the second digital wallet to the shared ledger maintained by the fund source (e.g., transacting bank, credit union, financial institution) of the second user when the second digital wallet establishes a network connection. As will be explained in more detail with respect to Step 206 below.

The digital currency program 110 may perform two or more transactions asynchronously. The digital currency program 110 may perform the two or more transactions asynchronously at the direction of the user. Performing the two or more transactions asynchronously may allow the user of the digital wallet 120 to record two or more transactions on the front end (e.g., local ledger) prior to the back end (e.g., shared ledger) update. The digital currency program 110 may generate or receive the hash value for each of the two or more transactions. The digital currency program 110 may record the hash value for each of the two or more transactions on the local ledger maintained on the digital wallet 120 before the digital currency program 110 broadcasts the local ledger maintained on the digital wallet 120 to the shared ledger maintained by the fund source (e.g., transacting bank, credit union, financial institution) of the user. The digital currency program 110 may perform the back end update of the two or more hash values for each of the two or more transactions performed by the user between broadcasts to the shared ledger.

Continuing with the above example in which the user of the digital wallet 120 sent the denomination of $20 U.S. dollars to the second digital wallet of the second user. The user of the digital wallet may now perform one or more additional transactions with one or more other digital wallets before the digital wallet 120 of the user establishes a network connection. The user of the digital wallet 120 may send a denomination of £5 (Five British Pounds) to a third digital wallet of a third user and send a denomination of A$10 (Ten Australian Dollars) to a fourth digital wallet of a fourth user before the digital currency program 110 broadcasts the local ledger maintained on the digital wallet 120 to the shared ledger maintained by the fund source (e.g., transacting bank, credit union, financial institution) that issued digital wallet 120 to the user. The user of the digital wallet 120 may perform as many transactions in one or more digital currencies in one or more denominations till the total transactions performed by the user reaches the defined capacity of the digital wallet 120. In this example the digital wallet 120 of the user received three hash values. The first hash value was generated by the digital currency program 110 on the second digital wallet of the second user and transmitted to the digital wallet 120 of the user. The second hash value was generated by the digital currency program 110 on the third digital wallet of the third user and transmitted to the digital wallet 120 of the user. The third hash value was generated by the digital currency program 110 on the fourth digital wallet of the fourth user and transmitted to the digital wallet 120 of the user. The digital currency program 110 on the digital wallet 120 recorded the hash value generated by the digital currency program 110 on the second digital wallet to the local ledger maintained on the digital wallet 120. The digital currency program 110 on the digital wallet 120 recorded the hash value generated by the digital currency program 110 on the third digital wallet to the local ledger maintained on the digital wallet 120. The digital currency program 110 on the digital wallet 120 recorded the hash value generated by the digital currency program 110 on the fourth digital wallet to the local ledger maintained on the digital wallet 120. The digital currency program 110 may broadcast the local ledger maintained on the digital wallet 120, with the three hash values, to the shared ledger maintained by the fund source (e.g., transacting bank, credit union, financial institution) of the user when the mobile device of the user establishes a network connection.

At 206, the digital currency program broadcasts a local ledger. The digital currency program 110 may broadcast the local ledger to a shared ledger. The local ledger may be maintained on the digital wallet 120. The local ledger may be a record of the one or more transactions performed by the user of the digital wallet 120. The record of the one or more transactions performed by the user of the digital wallet 120 may be comprised of the hash value for each of the one or more transactions performed by the user of the digital wallet 120. The shared ledger may be maintained by the fund source (e.g., transacting bank, credit union, financial institution) that issued the digital wallet 120 to the user.

The digital currency program 110 may broadcast the local ledger to the shared ledger when the mobile device in which the digital wallet 120 may be installed has an established network connection. The hash value recorded on the local ledger of the digital wallet, may include, but is not limited to including, the digital wallet identifier of a second digital wallet, the amount of digital currency of the transaction between the digital wallet 120 and the second digital wallet, and a label for the transaction. The hash value may also include the unique identification address of the second user and the currency identifier for the denomination of the digital currency of the transaction between the digital wallet 120 and the second digital wallet. The unique identification address of the second user and the currency identifier may be encrypted. The unique identification address of the second user and the currency identifier may be encrypted such that the user of the digital wallet may not be able to view the unique identification address of the second user and may not be able to view the currency identifier of the denomination of the digital currency of the transaction.

The digital currency program 110 may broadcast the local ledger to the shared ledger maintained by the fund source (e.g., transacting bank, credit union, financial institution). The shared ledger may receive the hash value for each of the one or more transactions performed by the user of the digital wallet 120. The digital currency program 110 may decrypt the hash value for each of the one or more transactions performed by the user of the digital wallet 120. The fund source (e.g., transacting bank, credit union, financial institution) may be able to view at least, the digital wallet identifier of the second digital wallet, the amount of digital currency of the transaction between the digital wallet 120 and the second digital wallet, the label for the transaction, the unique identification address of the second user, and the currency identifier for the denomination of the digital currency between the digital wallet 120 and the second digital wallet.

At 208, the digital currency program synchronizes the digital wallet. The digital currency program 110 may synchronize the digital wallet 120 with the fund source (e.g., transacting bank, credit union, financial institution) that issued the digital wallet 120 to the user. The digital currency program 110 may synchronize the digital wallet 120 with the fund source at the end of the active period. The digital currency program 110 may alternatively, or additionally, synchronize the digital wallet 120 with the fund source at intermittent time periods before the end of the active period. The intermittent time periods before the end of the active period may be determined by the fund source (e.g., transacting bank, credit union, financial institution). The digital currency program 110 may synchronize the digital wallet 120 with the fund source upon request. The digital currency program 110 may synchronize the digital wallet 120 with the fund source upon request from the fund source or request from the user of the digital wallet 120.

The digital currency program 110 may synchronize the digital wallet 120 with the fund source utilizing an amount (e.g., value) remaining of the defined capacity of the digital wallet 120 to release an equivalent amount of currency held in suspense by the fund source. If the active period has ended for the digital wallet 120, the digital currency program 110 may send the amount of digital currency remaining on the digital wallet to the fund source. The fund source, utilizing the digital currency program 110, may release an amount in suspense (e.g., escrow, frozen) equivalent to the amount remaining on the digital wallet.

For example, the digital wallet 120 issued by the fund source (e.g., transacting bank, credit union, financial institution) have a defined capacity of $100 U.S. dollars. The user of the digital wallet may have received $50 U.S. dollars during the active period of the digital wallet 120 and sent $70 U.S. dollars during the active period of the digital wallet 120. The digital currency program 110 may release $80 of the $100 U.S. dollars held in suspense by the fund source.

The user may request a new digital wallet from the fund source (e.g., transacting bank, credit union, financial institution) after the active period for the digital wallet 120 has expired. The unique identification address of the user may remain the same. The digital wallet identifier for the new wallet may be different than the digital wallet identifier of the digital wallet 120. For example, the user may provide authentication to the fund source and receive the unique identification address "A". The unique identification address "A" may be specific to the user. The digital wallet 120 issued to the user by the fund source may have the digital wallet identifier "b". The digital wallet identifier "b" may be specific to the digital wallet 120. The unique identification address and digital wallet identifier combination may be "Ab". When the active period for the digital wallet 120 expires, the user may request a new wallet from the fund source. The new digital wallet issued to the user by the fund source may have the digital wallet identifier "c". The digital wallet identifier "c" may be specific to the new digital wallet. The unique identification address and digital wallet identifier combination may now be "Ac".

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
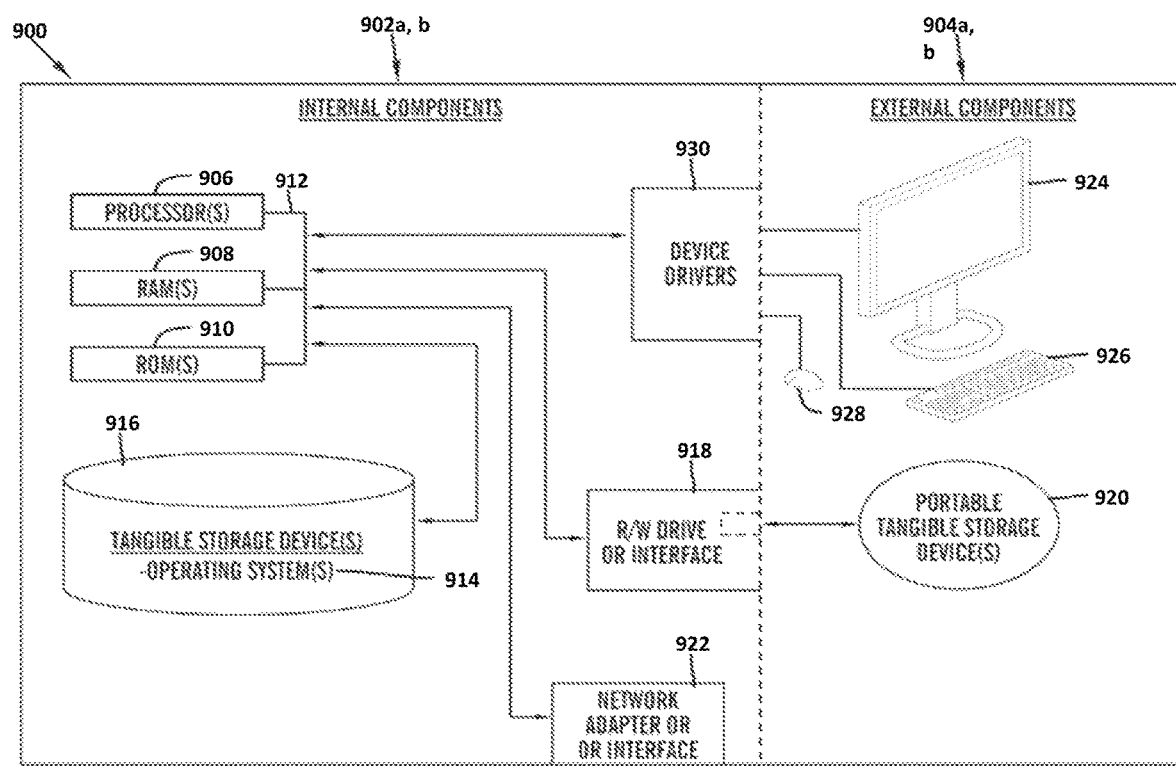
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the digital currency program 110a in client computer 102, and the digital currency program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the digital currency program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the digital currency program 110a in client computer 102 and the digital currency program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the digital currency program 110a in client computer 102 and the digital currency program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
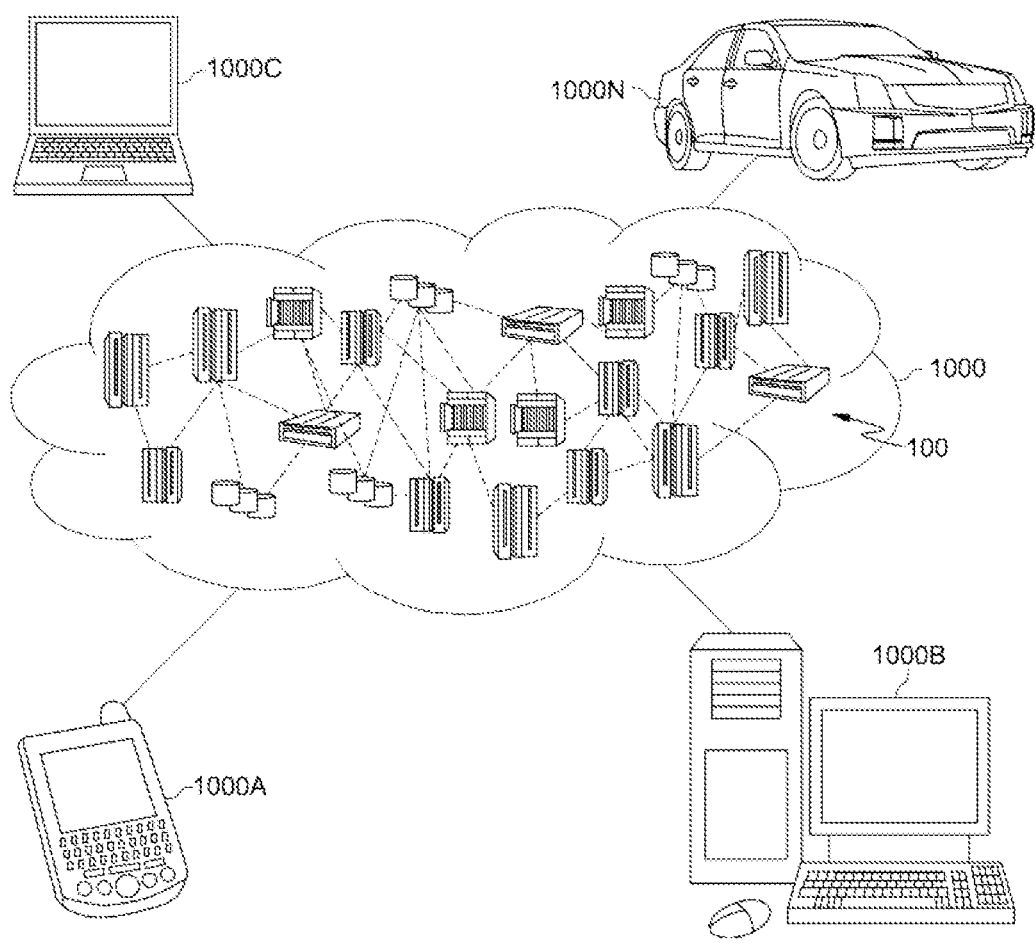
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
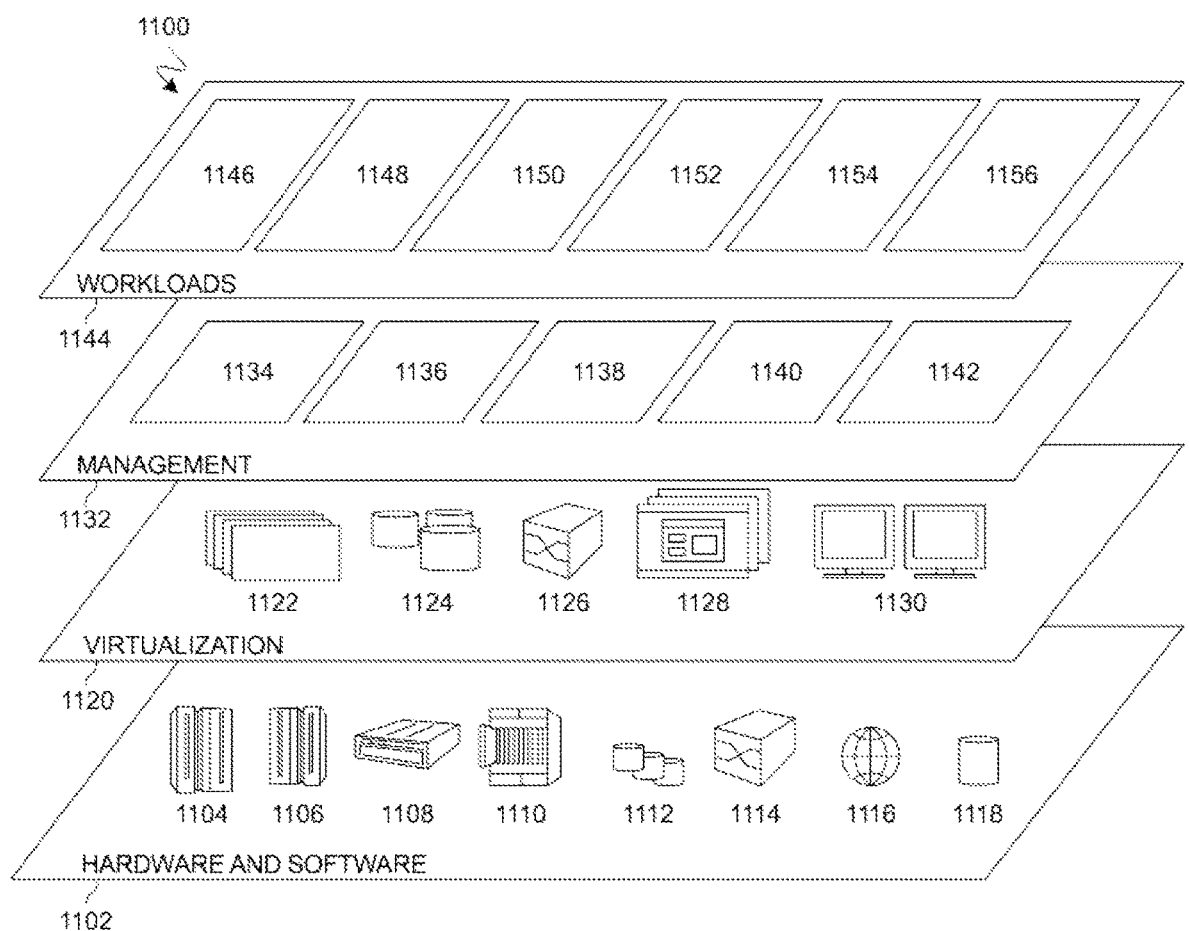
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and digital currency 1156. A digital currency program 110a, 110b provides a way to perform one or more transactions using one or more digital currencies while maintaining a local and shared ledger for tracking the one or more transactions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing digital currency, the method comprising:

initializing a digital wallet on a mobile device of a user, wherein the digital wallet includes a digital wallet identifier concurrently utilized for an active period of the digital wallet, wherein the active period is determined by the user and approved by a fund source;

receiving a plurality of digital currencies, wherein the plurality of digital currencies are received in one or more denominations selected by a user from a plurality of denominations specific to a corresponding stable currency, wherein each of the one or more denominations received are earmarked with a currency identifier enabling transactions to be performed asynchronously, and wherein at least two of the plurality of digital currencies are pegged to different corresponding stable currencies and the one or more denominations are specific to the at least two different corresponding stable currencies;

performing two or more transactions using the plurality of digital currencies, wherein at least two of the two or more transactions are performed in the different corresponding stable currencies, wherein each of the two or more transactions has a hash value and encrypted information recorded on a local ledger maintained on the digital wallet of the user;

broadcasting the local ledger to a shared ledger maintained by the fund source when the mobile device of the user establishes a network connection;

decrypting the encrypted information for each of the two or more transactions;

recording, to the shared ledger, the hash value and decrypted information of each of the two or more transactions maintained on the local ledger; and synchronizing the digital wallet with the fund source by releasing a value held in suspense based on a total value in a native currency of the user of a portion of the plurality of digital currencies remaining on the digital wallet.

2. The method of claim 1, wherein the digital wallet has a defined capacity, the defined capacity being the total value of one or more denominations of the plurality of digital currencies requested by the user, and wherein the defined capacity is less than or equal to a balance value of the user held by the fund source.

3. The method of claim 1, wherein performing the two or more transactions further comprises:

sending one or more denominations of a first digital currency to a second digital wallet of a second user and sending one or more denominations of a second digital currency to a third digital wallet of a third user, wherein the first digital currency and the second digital currency are pegged to different corresponding stable currencies;

generating, by the second digital wallet, the hash value for a first transaction between the user and the second user and generating, by the third digital wallet, the hash value for a second transaction between the user and the third user;

recording the hash value for the first transaction on a local ledger maintained on the second digital wallet and recording the hash value for the second transaction on a local ledger maintained on the third digital wallet; and transmitting, by the second digital wallet and the third digital wallet, the hash value of the first transaction and the hash value of the second transaction to the digital wallet, wherein the hash value for each transaction is recorded on the local ledger maintained on the digital wallet.

4. The method of claim 3, wherein a Near-Field Communication protocol is utilized to connect the digital wallet of the user with the second digital wallet of the second user and the third digital wallet of the third user, wherein a digital wallet identifier of the second digital wallet and a digital wallet identifier of the third digital wallet is identified using a camera associated with the mobile device of the user.

5. The method of claim 1, wherein synchronizing the digital wallet further comprises:

synchronizing the digital wallet with the fund source at an end of the active period, wherein the active period is an amount of time in which a digital wallet identifier of the digital wallet may be utilized by the user; and initializing a new digital wallet, wherein the new digital wallet is initialized by the fund source after receiving a request from the user, wherein a unique identification of the user is the same in the digital wallet and the new digital wallet, and wherein a digital wallet identifier of the new digital wallet is unique from the digital wallet identifier of the digital wallet.

6. A computer system for managing digital currency, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

initializing a digital wallet on a mobile device of a user, wherein the digital wallet includes a digital wallet identifier concurrently utilized for an active period of the digital wallet, wherein the active period is determined by the user and approved by a fund source;

receiving a plurality of digital currencies, wherein the plurality of digital currencies are received in one or more denominations selected by a user from a plurality of denominations specific to a corresponding stable currency, wherein each of the one or more denominations received are earmarked with a currency identifier enabling transactions to be performed asynchronously, and wherein at least two of the plurality of digital currencies are pegged to different corresponding stable currencies and the one or more denominations are specific to the at least two different corresponding stable currencies;

performing two or more transactions using the plurality of digital currencies, wherein at least two of the two or more transactions are performed in the different corresponding stable currencies, wherein each of the two or more transactions has a hash value and encrypted information recorded on a local ledger maintained on the digital wallet of the user;

broadcasting the local ledger to a shared ledger maintained by the fund source when the mobile device of the user establishes a network connection;

decrypting the encrypted information for each of the two or more transactions;

recording, to the shared ledger, the hash value and decrypted information of each of the two or more transactions maintained on the local ledger; and synchronizing the digital wallet with the fund source by releasing a value held in suspense based on a total value in a native currency of the user of a portion of the plurality of digital currencies remaining on the digital wallet.

7. The computer system of claim 6, wherein the digital wallet has a defined capacity, the defined capacity being the total value of one or more denominations of the plurality of digital currencies requested by the user, and wherein the defined capacity is less than or equal to a balance value of the user held by the fund source.

8. The computer system of claim 6, wherein performing the two or more transactions further comprises:

sending one or more denominations of a first digital currency to a second digital wallet of a second user and sending one or more denominations of a second digital currency to a third digital wallet of a third user, wherein the first digital currency and the second digital currency are pegged to different corresponding stable currencies;

generating, by the second digital wallet, the hash value for a first transaction between the user and the second user and generating, by the third digital wallet, the hash value for a second transaction between the user and the third user;

recording the hash value for the first transaction on a local ledger maintained on the second digital wallet and recording the hash value for the second transaction on a local ledger maintained on the third digital wallet; and transmitting, by the second digital wallet and the third digital wallet, the hash value of the first transaction and the hash value of the second transaction to the digital wallet, wherein the hash value for each transaction is recorded on the local ledger maintained on the digital wallet.

9. The computer system of claim 8, wherein a Near-Field Communication protocol is utilized to connect the digital wallet of the user with the second digital wallet of the second user and the third digital wallet of the third user, wherein a digital wallet identifier of the second digital wallet and a digital wallet identifier of the third digital wallet is identified using a camera associated with the mobile device of the user.

10. The computer system of claim 6, wherein synchronizing the digital wallet further comprises:

synchronizing the digital wallet with the fund source at an end of the active period, wherein the active period is an amount of time in which a digital wallet identifier of the digital wallet may be utilized by the user; and initializing a new digital wallet, wherein the new digital wallet is initialized by the fund source after receiving a request from the user, wherein a unique identification of the user is the same in the digital wallet and the new digital wallet, and wherein a digital wallet identifier of the new digital wallet is unique from the digital wallet identifier of the digital wallet.

11. A computer program product for managing digital currency, comprising:

one or more non-transitory computer-readable storage media and program instructions stored on at least one of the one or more tangible storage media, the program instructions executable by a processor to cause the processor to perform a method comprising:

initializing a digital wallet on a mobile device of a user, wherein the digital wallet includes a digital wallet identifier concurrently utilized for an active period of the digital wallet, wherein the active period is determined by the user and approved by a fund source;

receiving a plurality of digital currencies, wherein the plurality of digital currencies are received in one or more denominations selected by a user from a plurality of denominations specific to a corresponding stable currency, wherein each of the one or more denominations received are earmarked with a currency identifier enabling transactions to be performed asynchronously, and wherein at least two of the plurality of digital currencies are pegged to different corresponding stable currencies and the one or more denominations are specific to the at least two different corresponding stable currencies;

performing two or more transactions using the plurality of digital currencies, wherein at least two of the two or more transactions are performed in the different corresponding stable currencies, wherein each of the two or more transactions has a hash value and encrypted information recorded on a local ledger maintained on the digital wallet of the user;

broadcasting the local ledger to a shared ledger maintained by the fund source when the mobile device of the user establishes a network connection;

decrypting the encrypted information for each of the two or more transactions;

recording, to the shared ledger, the hash value and decrypted information of each of the two or more transactions maintained on the local ledger; and synchronizing the digital wallet with the fund source by releasing a value held in suspense based on a total value in a native currency of the user of a portion of the plurality of digital currencies remaining on the digital wallet.

12. The computer program product of claim 11, wherein the digital wallet has a defined capacity, the defined capacity being the total value of one or more denominations of the plurality of digital currencies requested by the user, and wherein the defined capacity is less than or equal to a balance value of the user held by the fund source.

13. The computer program product of claim 11, wherein performing the two or more transactions further comprises:

sending one or more denominations of a first digital currency to a second digital wallet of a second user and sending one or more denominations of a second digital currency to a third digital wallet of a third user, wherein the first digital currency and the second digital currency are pegged to different corresponding stable currencies;

generating, by the second digital wallet, the hash value for a first transaction between the user and the second user and generating, by the third digital wallet, the hash value for a second transaction between the user and the third user;

recording the hash value for the first transaction on a local ledger maintained on the second digital wallet and recording the hash value for the second transaction on a local ledger maintained on the third digital wallet; and transmitting, by the second digital wallet and the third digital wallet, the hash value of the first transaction and the hash value of the second transaction to the digital wallet, wherein the hash value for each transaction is recorded on the local ledger maintained on the digital wallet.

14. The computer program product of claim 11, wherein synchronizing the digital wallet further comprises:

synchronizing the digital wallet with the fund source at an end of the active period, wherein the active period is an amount of time in which a digital wallet identifier of the digital wallet may be utilized by the user; and initializing a new digital wallet, wherein the new digital wallet is initialized by the fund source after receiving a request from the user, wherein a unique identification of the user is the same in the digital wallet and the new digital wallet, and wherein a digital wallet identifier of the new digital wallet is unique from the digital wallet identifier of the digital wallet.

15. The method of claim 3, wherein the encrypted information includes at least one or more of a label for each of the one or more transactions, the currency identifier of the one or more denominations of the first digital currency and the second digital currency sent to the second digital wallet and the third digital wallet, or a unique identification address of the second user and the third user.

16. The computer system of claim 8, wherein the encrypted information includes at least one or more of a label for each of the one or more transactions, the currency identifier of the one or more denominations of the first digital currency and the second digital currency sent to the second digital wallet and the third digital wallet, or a unique identification address of the second user and the third user.

17. The computer program product of claim 13, wherein the encrypted information includes at least one or more of a label for each of the one or more transactions, the currency identifier of the one or more denominations of the first digital currency and the second digital currency sent to the second digital wallet and the third digital wallet, or a unique identification address of the second user and the third user.

18. The method of claim 1, wherein the currency identifier is specific to each of the one or more denominations of the plurality of digital currencies and utilized in tracking the use of the one or more denominations in the two or more transactions.

19. The method of claim 1, wherein the one or more denominations of the plurality of digital currencies are maintained in the digital wallet of the user and wherein each of the plurality of digital currencies has a fixed rate of exchange with one of the at least two different corresponding stable currencies.

20. The method of claim 1, wherein performing the two or more transactions using the plurality of digital currencies, further comprises:

locking a portion of the defined capacity of the digital wallet corresponding to the one or more denominations of the corresponding stable currency utilized in performing the two or more transactions.

* * * * *